(12) United States Patent
Shenoy et al.

(10) Patent No.: US 10,264,084 B2
(45) Date of Patent: Apr. 16, 2019

(54) UPDATING PLAYLISTS USING PUSH AND PULL

(71) Applicant: Apple Inc., Cupertino, CA (US)

(72) Inventors: Arvind S. Shenoy, Cupertino, CA (US); Priyo Mustafi, Cupertino, CA (US); Paul C. Irvine, Cupertino, CA (US); Venkat Kranthi Chalasani, Cupertino, CA (US); Thomas Alsina, Cupertino, CA (US); Cody D. Jorgensen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 655 days.

(21) Appl. No.: 14/871,885

(22) Filed: Sep. 30, 2015

(65) Prior Publication Data

US 2017/0093999 A1 Mar. 30, 2017

(51) Int. Cl.
*H04L 29/08* (2006.01)

(52) U.S. Cl.
CPC .............. *H04L 67/26* (2013.01); *H04L 67/06* (2013.01); *H04L 67/18* (2013.01); *H04L 67/322* (2013.01)

(58) Field of Classification Search
CPC ......... H04L 67/26; H04L 67/18; H04L 67/06; H04L 67/322
See application file for complete search history.

(56) References Cited

U.S. PATENT DOCUMENTS

| | | | |
|---|---|---|---|
| 2004/0181604 A1 | 9/2004 | Immonen | |
| 2004/0242286 A1* | 12/2004 | Benco | H04M 3/28 455/574 |
| 2008/0059631 A1* | 3/2008 | Bergstrom | H04N 7/17318 709/224 |
| 2010/0088327 A1* | 4/2010 | Holm | G06F 17/30053 707/758 |
| 2010/0153218 A1 | 6/2010 | Wilson et al. | |
| 2011/0295843 A1* | 12/2011 | Ingrassia, Jr. | G06F 17/30053 707/723 |
| 2012/0290621 A1* | 11/2012 | Heitz, III | G06F 17/30772 707/780 |
| 2012/0290648 A1* | 11/2012 | Sharkey | G06F 17/30053 709/204 |
| 2014/0067901 A1* | 3/2014 | Shaw | G06Q 10/10 709/201 |

(Continued)

*Primary Examiner* — Michael A Keller
*Assistant Examiner* — Jsing Forng Lin
(74) *Attorney, Agent, or Firm* — Fletcher Yoder PC

(57) ABSTRACT

Some implementations allow users to create and share data including playlists. Such playlists may be subscribed to by other users. Changes to such playlists, such as updates by the curator of the playlist, must be propagated to subscribers in a timely manner while efficiently utilizing resources. Some implementations allow updates to be propagated using a push notification to cause client devices to request the update (push). Alternatively, updates may be made when the client devices of the subscribers next accesses the system (pull). An aggregator system may be used to make decisions on which users to send push notifications, and which users to wait to pull updates on their own. Additionally, the aggregator may determine that certain playlist updates should be distributed using push notifications. The aggregator may determine that only certain playlist subscribers should receive push notifications regarding playlist updates.

22 Claims, 6 Drawing Sheets

(56) References Cited

U.S. PATENT DOCUMENTS

| | | | |
|---|---|---|---|
| 2014/0282686 A1 | 9/2014 | Silverman et al. | |
| 2015/0081664 A1* | 3/2015 | Gabel | H04H 60/65 707/709 |
| 2015/0142798 A1* | 5/2015 | Poupko | H04L 67/2804 707/736 |
| 2015/0189474 A1* | 7/2015 | Amrhein | H04W 4/025 455/456.3 |
| 2016/0359791 A1* | 12/2016 | Zhang | H04L 51/32 |
| 2017/0041261 A1* | 2/2017 | Richter | G06F 17/30053 |
| 2018/0176273 A1* | 6/2018 | McEvoy | G06Q 50/00 |

* cited by examiner

UPDATING PLAYLISTS USING PUSH AND PULL

TECHNICAL FIELD

The disclosure generally relates to networked data storage and updating client devices.

BACKGROUND

Playlists provide a mechanism for users to organize media items for playback on a computing device. A user can generate a personal playlist that incorporates songs from the user's digital music library, for example. Users can share playlists. For example, a user can subscribe to a playlist created or curated by another user and receive information describing the curator's playlist. When the curator of a playlist updates the playlist, subscribers to the playlists can receive data that describes the updates to the subscribed playlist.

SUMMARY

In some implementations, a computer system can determine whether to notify playlist subscribers of playlist updates based on information corresponding to the playlist and/or the subscribing user. The system can determine whether an update to a playlist should be pushed to subscribers of the playlist based on the type of change to the playlist, the popularity of the playlist, how frequently the playlist is changed, and/or other playlist factors. The system can determine whether an update to the playlist should be pushed to a particular subscriber based on when the subscriber subscribed to the playlist, the proximity of the subscriber to the curator, how many push notification updates the subscriber has recently received and/or other user factors. In some implementations, the system can use a scoring system to determine whether to send playlist push notification updates to users. In some implementations, the system can determine that a playlist push notification update should be sent to a user based on a predicted user activity.

Certain advantages of the systems described herein include improved efficiency of the update system as only targeted playlists and subscribers may be sent an update push notification. These advantages can lead to an improved user experience as updates can be quickly delivered to subscribers who are more apt to utilize the updates. For example, subscribers in close proximity to the curator, and/or subscribers who frequently access the playlist may more quickly receive an update.

Details of one or more implementations are set forth in the accompanying drawings and the description below. Other features, aspects, and potential advantages will be apparent from the description and drawings, and from the claims.

DETAILED DESCRIPTION

Figure 1:
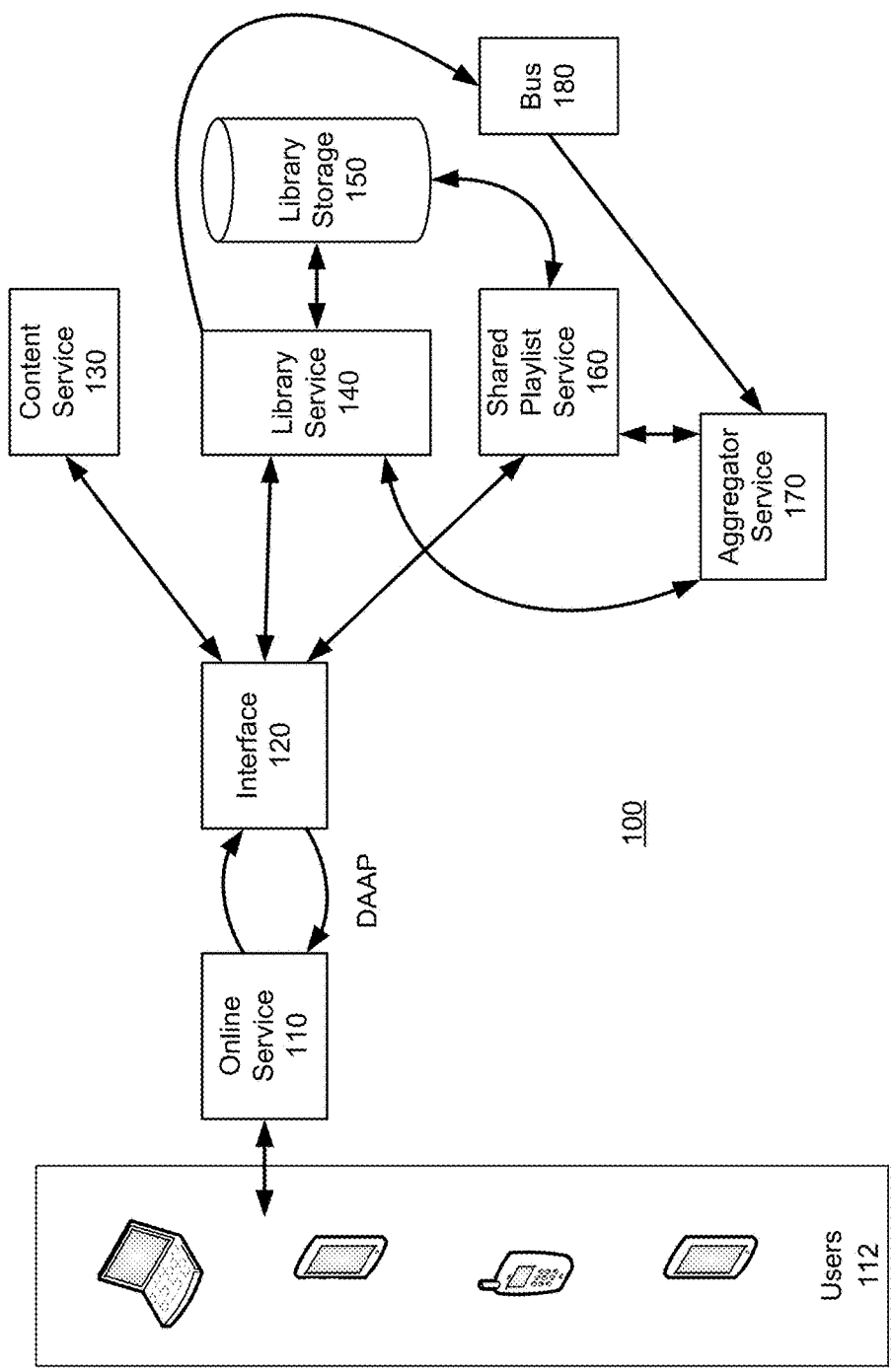
FIG. 1 is a block diagram of an example system for updating playlists using push or pull.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Overview

Music services allow networked computer users to create and share data online including music grouped into playlists. These music services may allow users to subscribe to a playlist in order to enjoy a compilation of media such as music tracks created by and curated by another user. For example, a friend, a colleague, an expert in a field, or a celebrity may create and share a playlist to which another user can subscribe. Changes to such playlists, such as updates by the creator, owner, or curator of the playlist, can be propagated to subscribers in a timely manner while efficiently utilizing resources.

Certain implementations may be used to propagate updates to playlist subscribers using a push notification to prompt client devices of subscribers to request the update. Alternatively, updates may be pulled when the client devices of the subscribers next accesses the system without prompting. As used herein, a push notification is a message indicating that a playlist has been updated. The push notification is sent to a subscriber's client device prompting the client device to access the system and receive the playlist update. A pull update is a playlist update performed on a certain interval, in response to user input, or when the client device navigates to a server that provides playlist update information.

As it may be desirous to meter the number of client devices receiving an update at any given time, an Aggregator Service may be used to determine that certain playlist updates should be distributed using push notifications. The Aggregator Service may determine to which subscriber client devices the push notifications should be sent, and which subscriber client devices should wait to pull updates on their own. For example, early subscribers, who fall under a threshold number, may receive push notifications but later subscribers may not. For example, the first 100 subscribers to a playlist may receive push notifications of an update while other subscribers (e.g., subscribers 101-*n*) can pull playlist updates from the system on their own, without receiving the push notification prompt. As another example, subscribers with a play history indicating active use of the playlist may receive a push notification. As another example, subscribers who are physically close to a playlist curator may receive a push notification for an update to the playlist, while others may not. As another example, subscribers who are allowed to edit a particular playlist may receive a push notification.

Various criteria may be used by the Aggregator Service to determine if and when to send a push notification based on the playlists and/or the subscribers. For example, the Aggregator Service can generate a subscriber score for determining when to send a push notification to a particular subscriber. Such a subscriber score can be based on various criteria regarding an individual subscriber, for example, the time between a playlist creation and a subscription, the physical proximity of the playlist curator and subscriber, the number of recent push notifications updating other playlists that a subscriber has received, the battery life of the subscriber's client device, frequency of a particular subscriber's client device accessing or playing the playlist, and/or the time of day a subscriber's client device accesses or plays the playlist. In some implementations, information about subscribers of the system may be gathered from individual subscribers, or through linking to a social media account. User demographics, friend information, and online activity may be used by the system as well to generate scores and decide which subscribers to send push notifications.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

The Aggregator Service can generate a playlist score based on various criteria regarding the playlist. For example, a playlist score may be based on how frequently the playlist is changed, the degree to which the playlist has been changed—for example, if only one song is changed or half of the playlist is changed, the status of the playlist curator, for example if the curator is a celebrity or marketing centerpiece, and/or the number of subscribers to the playlist and/or other playlist criteria. In some implementations, push notifications may be metered by time. In some implementations, a combination of subscriber and playlist scores may be used to determine whether and to which subscribers to send a push notification.

Users can utilize such online services through any of various client devices, computing devices or computers, including but not limited to mobile phones, smartphones, tablet computers, laptop computers, desktop computers, wearable computers such as watches and glasses, as well as automobiles and other internet connected devices such as home appliances or set top boxes, for example.

For example, the user client devices can communicate through any of various wireless methods, including but not limited to cellular, nano-cell, pico-cell, WiFi, Bluetooth Low Energy, near field communications, or any other kind of wireless communication.

While implementations described herein refer to music playlists as an example of a media collections that can be updated using push notifications, any kind of media can be shared as described herein. For example, other media collections such as music, photos or videos, a message service, chat service, or message board can be shared and/or updated using the push notification features described herein. The systems could be used for sharing collaboratively edited documents, photo libraries, contacts lists, news feeds, etc. and updating changes.

As used herein, the terms owner, curator, and creator of a playlist may be used interchangeably and are not intended to be limiting. Such terms refer to a user who, through the system, designates particular media such as music tracks, to be associated with a playlist, makes updates to the playlist and has subscribers which desire to access the playlist and its updates.

Online Music Playlist Examples

Implementations described herein provide networked systems that may be used to provide a service, such as an online music service, that allows users to access music downloads for their client devices. Such services may allow for the users of the service to not only access music tracks one at a time, but to also compile groupings of music tracks and label the groupings as a playlist.

Users of the example music service may not only be able to compile their own playlists, but may also share the playlists with other networked users. Shared playlists may allow the other users to search for, find, and enjoy the music track lists compiled by other users (e.g., friends, celebrities, experts or other fans).

In some implementations, users can subscribe to a playlist. A subscriber to a playlist may receive updates to the playlist from the system, if and when the original curator of the playlist makes changes to it. A curator could be a single user or a group of users who all have permission to edit a playlist.

For example, a curator, may make a playlist and name it "Workout Mix" which includes five music tracks. That curator has five friends who, through the music service, subscribe to the Workout Mix playlist because they wish to access those tracks and receive updates to that playlist. When the curator later decides to add a music track and/or change the order of the playlist, the subscribers can receive the update to the Workout Mix playlist.

In certain examples, there could be multiple individuals who are all curators of the same playlist. For example, the curators of the Workout Mix playlist are all editors of a health magazine, who all have permission to edit the playlist.

The systems and methods described herein may be used to determine how and when to push notifications of such updates to subscribers. Because communicating data to a subscriber about the playlist update, and downloading the updates to the subscribers can consume a lot of system resources, various considerations may be taken into account in order to best utilize the system resources, and yet still provide playlist update information to subscribers who care about the updates.

Push Examples

One way the system may notify subscribers of a playlist update is through a push notification. Using a push notification, the system may proactively notify a subscriber client device of an update to a subscribed playlist. The push notification can prompt the subscriber client device to log into the service and download the update after receiving the push notification. In certain examples, this log in and download can be done by the subscriber client device, after it receives the push notification, and without external input by the human subscriber. In certain examples, the log in and download my require the human subscriber to approve.

By sending a push notification to subscriber client devices, the system can ensure that the subscribers receive notification of the update quickly. But, sending a push notification, to multiple users, can result in a fairly high amount of log in and download return traffic to the system. Therefore, the system may use certain criteria, as described herein, to push notifications only to certain subscribers, and/or to push notifications only regarding certain playlists, and/or to push notifications at a metered timing to regulate the traffic to the system at any given time.

Pull Examples

Another way the system may update subscribers is through a pull update. For example, the system may wait for a subscriber to access the system with their client device and then inform the client device of a playlist update. This requires no proactive notification by the system.

For example, for a pull update, if a particular subscriber doesn't ever access the system, the subscriber's client device will never receive the update. And if the particular subscriber doesn't access the system for a week, the subscriber's client device will not receive the update for a week. For example, not sending push notifications to update playlist subscribers can result in less network traffic and fewer resources used than push notification updates because some subscribers may never request a pull update. Subscribers who do request pull updates will make the pull request will make the request at random times, unlike the prompted push notification system described above where the push notification updates will be requested soon after the subscriber client device receives the push notification.

Example Network Elements

FIG. 1 is a block diagram of an example system 100 for updating playlists using push notifications. For example, the system 100 includes a network of various elements which may be utilized in practicing the implementations described herein. It should be noted that the elements of the system as shown could be networked in any of various ways. For example, the communication of the various elements could occur over the Internet or a local area network, or any combination conducted by wired communications, wireless communications, or a combination of both. Also, certain features may be combined or rearranged than how they are shown in the FIG. 1 example.

In some implementations, system 100 includes an Online Service 110. For example, the Online Service 110 can be an online music service, provided to Networked Users 112. In this context, a Networked User 112 may be the client device used by a subscriber, who has logged into the system. The software running on the client device allows the system to associate the client device to that user's account and communicate with the system to receive music, create playlists, subscribe to playlists, and receive updates to playlists. The Online Service 110 allows Networked Users 112 to play music on their respective client devices as well as create, share, and subscribe to playlists. The Online Service 110 may communicate with the various Networked Users 112 to deliver the online music service through networked communications, for example by the Internet, in wired communication, wireless communication, or a combination of wired and wireless communication.

In the example of FIG. 1, the Online Music Service 110 may use Digital Audio Access Protocol (DAAP) in its network connection protocol communications through an Interface 120 with the various systems used in delivering the music to the Networked Users 112. In the example of FIG. 1, one such system with which the Online Service 110 communicates through the Interface 120 is a Content Service 130. The Content Service 130 provides metadata associated with the music files used in the online music service. The metadata in this example could be used for any number of purposes, and in the music example here, could incorporate information about the music artist name, play time, album name, music genre, playlist inclusion, music track length, track names, numbers of tracks, along with any other pieces of data useful in the system.

In the example of FIG. 1, another such system with which the Online Service 110 communicates through the Interface 120 is the Library Service 140. The Library Service 140 is a service connecting various elements of the overall system 100, for example, with the Library Storage 150. The Library Storage 150 is any of various data storage devices that stores the underlying music, files in this example, to be accessed by the Networked Users 112. The Library Service 140 may access the music data in the Library Storage 150 to send to the Networked Users 112.

In some implementations, another such system with which the Online Service 110 communicates through the Interface 120 is the Shared Playlist Service 160. The Shared Playlist Service 160 provides information regarding which music tracks correspond to a particular playlist that was created and curated by a user. The Shared Playlist Service 160 may record information linking a playlist to users who have subscribed to that playlist.

The Shared Playlist Service 160 can access the Library Storage 150 in order to coordinate the playlist data. The Shared Playlist Service 160 may provide playlist information regarding whether user can subscribe or share the playlists. Additionally or alternatively, the Shared Playlist Service 160 may provide information as to whether the playlists are available to the public, or if playlists are private and require a special invitation from the curator to subscribe.

For example, if a user creates a playlist, the Shared Playlist Service 160 could coordinate with the Library Storage 150 to properly indicate which tracks are in that playlist. And when another user accesses that playlist through the Online Service 110, the Shared Playlist Service 160 can indicate which tracks to send to the requesting user. The Shared Playlist Service 160 may also receive and manage any updates to a playlist that a user makes after it is created. For example, the Shared Playlist Service 160 can add songs to the playlist or can remove songs from the playlist based on the user's updates. The Shared Playlist Service 160 may associate information about subscribers such as the number of subscribers or demographics about the subscribers to a particular playlist. The Shared Playlist Service 160 may provide trend analytics regarding playlist subscriber numbers over time and/or demographics such as the age of subscribers.

Aggregator Service Examples

In some implementations, an Aggregator Service 170 can determine which subscribers receive a push notification of a playlist update when the playlist is updated by the curator of the playlist. In this determination, the Aggregator Service may use various criteria about the playlist itself, and/or the subscribers and curator of the playlist.

In order to gather this criteria to use in making the determination of whether and to which subscribers to send a push notification update, the Aggregator Service 170 may interface with the Library Service 140 by a Bus 180. Through the Library Service 140, the Aggregator Service 170 can access the stored music data in the Library Storage 150.

The Aggregator Service 170 may communicate with the Shared Playlist Service 160. Through the Shared Playlist Service 160, the Aggregator Service 170 may gather information about the playlists as well as information about subscribers as described herein. Playlist information may include the number of subscribers to a playlist, trend analytics regarding playlist subscriber numbers, the time between creation of a playlist and a first update, the time between subsequent playlist updates, the status of the curator of the playlist and whether that curator is deemed important. Subscriber information may include the location of a subscriber, the frequency of push notification updates to a particular subscriber, or any of other various criteria described herein. The Aggregator Service 170 may also determine from the Shared Playlist Service 160 information that a single subscriber requires updates to multiple playlists. Such push notification updates to multiple playlists may be coalesced and sent at one time.

In some implementations, Aggregator Service 170 uses all or some of these criteria to generate a score, for either or both of the playlist itself and the individual subscribers. In certain examples, such a score may then be compared to a threshold or various thresholds in order to make the determination of whether to send a push notification to a subscriber as described herein.

Score Implementation Examples

In some implementations, Aggregator Service 170 may take various criteria and generate a score to be used to determine whether to send a push notification to notify a subscriber client device about an update to a particular playlist, and if so, to which subscribers. Such a score may be created for a playlist to determine whether to send an update push notification to all or some of the subscribers of that playlist. Such a playlist score could be used to determine whether to send an update push notification to a group of playlists.

In some implementations, the Aggregator Service 170 may generate a score for an individual or group of subscribers to determine if that particular subscriber should receive a playlist update push notification. In another example, the Aggregator Service 170 can generate both a playlist and subscriber score and use both to determine to which subscribers to send an update push notification.

Such scores may also be used to determine at what time, not just whether to send a playlist update push notification or not. Either or both of the playlist score and subscriber score may be used in a determination by the Aggregator Service to send a push notification to a subscriber.

In some implementations, Aggregator Service 170 may determine any of various thresholds to be used with scores as described herein. An example of using a threshold may be to keep track of the time that individual subscribers first subscribed to a playlist. For example, based on the total number of eventual subscribers, the Aggregator Service could determine that the first 10% of the subscribers would receive a push notification of an update to the playlist. In certain implementations, the Aggregator Service may then use other scoring criteria to make further determinations of whether to send push notifications to subscribers who do not meet the 10% threshold, as in this example.

Another example implementation may use a threshold to compare a score against, for either or both the playlist score and/or subscriber score. If any given score is above a particular threshold, the Aggregator System can instruct the system to send a push notification of the update to that subscriber. If the score is under the threshold, the system may wait for the subscriber to pull an update instead of pro-actively prompting a push notification update. The threshold could be tailored to whatever criteria is being used to generate the score as described herein.

In certain examples, the threshold may change, depending on the stress that the system experiences at any particular time, or that the system anticipates it will experience at a particular time. For example, if it is determined that too many push notification updates are being sent and/or serviced at a particular time, the threshold may go up, thereby dropping the number of push notifications being sent and updates being serviced. If there is little activity at a particular time, and there is available bandwidth to service updates, the threshold may go down, thereby increasing the number of subscribers who receive a push notification of an update.

Figure 2:
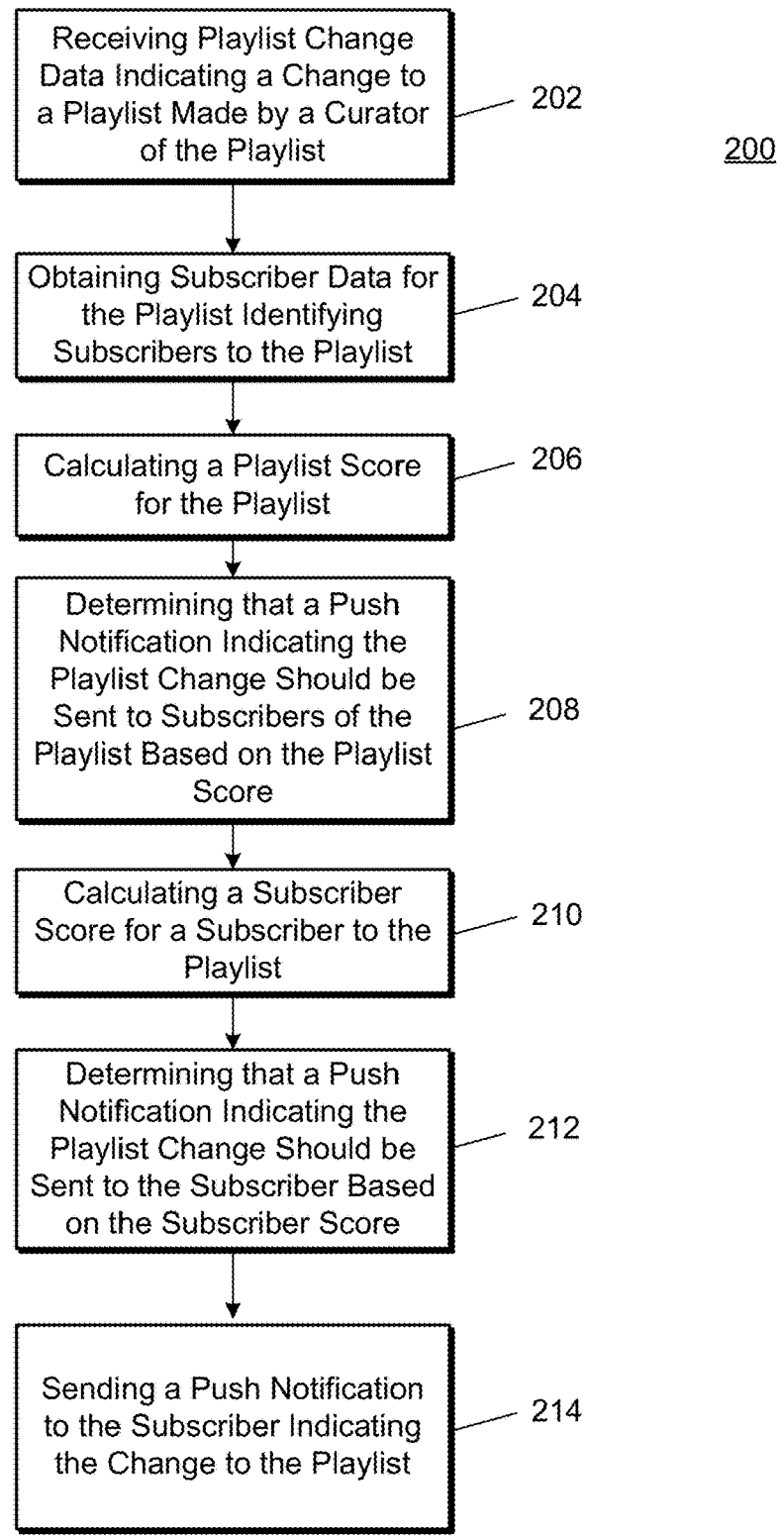
FIG. 2 is a flow diagram of an example process for sending push notification updates to a playlist subscriber based a playlist score and/or a subscriber score.

FIG. 2 is a flow diagram of an example process for sending push notification updates to a playlist subscriber based a playlist score and/or a subscriber score.

In this example, first, the Aggregator Service may receive some playlist change data indicating a change to a playlist made by a curator of the playlist (202). For example, the change can be from a curator user who edits a playlist that the user created. A change can be any kind of edit to the playlist. For example, the user can add or remove songs, change the name of the playlist, or any other various changes. The Shared Playlist Service records these changes to the playlists so the Aggregator Service may access the playlist change data.

Next, the Aggregator Service may obtain subscriber data for the playlist identifying subscribers to the playlist (204). The Shared Playlist Service may also store information linking the playlist with all of the users who are subscribed to that playlist. This list of subscribers may be accessed by the Aggregator Service and used as criteria in the push/pull scoring and decision as described herein.

Next, the Aggregator Service may calculate a playlist score for the playlist (206). Playlist criteria used to calculate a playlist score may come from the Shared Playlist Service. A playlist score could be based on any of various criteria such as if the curator of a playlist is a designated celebrity, expert, or important marketing piece, those playlists may be determined to be more important and the playlist score may be increased. Examples include the frequency of playlist changes, where frequent updates may increase or decrease a playlist score. Another example may be what changes were made to a playlist, for example, if many songs were changed, the playlist score may be increased more than if just the order of the songs or only one song were changed. Another example may be the playlist subscriber numbers, where changes to playlists with many subscribers receive a higher playlist score than changes to a playlist with fewer subscribers. A playlist that is being promoted by a company or record label may have an increased playlist score. A playlist that receive many edits may receive an increased playlist score over a playlist that is rarely updated. A playlist curated by a user who has other playlists which are popular may receive an increased playlist score. The Aggregator Service may also use trend information to create a playlist score, for example, a playlist which is rapidly gaining subscribers may have an increased playlist score.

Then the Aggregator Service may determine that a push notification indicating the playlist change should be sent to subscribers of the playlist based on the playlist score (208). Here the Aggregator Service compares the calculated playlist score to a threshold to determine whether to send any push notifications to any subscribers for this playlist. If the playlist score is higher than the threshold, then the Aggregator Service may determine to which subscribers to send the push notifications. Any combination of these criteria could be used to generate a playlist score.

Next, the Aggregator Service may calculate a subscriber score for a subscriber to the playlist (210). Once the Aggregator Service determines to send push notifications to some and not all of the subscribers of the playlist, it may calculate subscriber scores for the individual subscribers to this playlist. As described herein, such a subscriber score may include any of various criteria and may come from the Shared Playlist Service. Examples of criteria used to determine an individual subscriber score may include the timing that the user subscribed to the playlist, for example, an early subscriber may receive an increased subscriber score as described in FIG. 3. Another example may be the physical location of the subscriber, either relative to the curator user at a certain time, or in a specific geography, where close subscribers to a curator may receive an increased subscriber score, or subscribers in a designated geography may receive an increased subscriber score. Such examples are described in detail in FIGS. 4 and 5.

Another criteria may be how often a subscriber plays the playlist, such as a play history. Active subscribers may receive a push notification and subscribers that play the playlist less frequently do not receive a push notification. Another criteria may be the recent history of push notification updates that subscriber has received. For example, a subscriber score may go down if the client device of a subscriber has received many recent push notifications. For example, the battery life of a subscriber's client device, where a low battery decreases the subscriber score over a subscriber with a client device having a fully charged battery. For example, data regarding the last time a particular subscriber accessed a particular playlist may be used, where the subscriber score is increased for subscribers who more recently accessed a certain playlist. For example, a subscriber score may go up if a subscriber first subscribed to the playlist as soon as it was created. For example, a subscriber score may go up if the subscriber is in close proximity to the curator of the playlist. A subscriber that has permission to edit a playlist may also receive a push notification. Any combination of these criteria could be used to generate a subscriber score.

Then the Aggregator Service may determine that a push notification indicating the playlist change should be sent to the subscriber based on the subscriber score (212). This determination step may be a comparison of the individual subscriber scores to a threshold. Those subscriber scores over the threshold will receive a push notification from the service, while those subscriber scores below the threshold will not. In certain examples, the Aggregator Service may use such a subscriber score in conjunction with other scores as described herein. Thus, any of these criteria, and any mix of criteria may be used to create a subscriber score, from all of these sources or any combination of them.

Finally, if so determined, the Aggregator Service may send a push notification to the subscriber indicating the change to the playlist (214). Once the subscribers with subscriber scores over the threshold are identified by the Aggregator Service, those subscribers will receive a push notification prompting their client device to access the system and receive the playlist update.

Subscriber Score—Timing of Subscription Examples

As described, one such subscriber criteria that the system may use to determine whether to send a playlist update notification may be the timing, or in what order a particular user or group of users first subscribed to a particular playlist. For example, the first 100 subscribers to a playlist may receive a push notification of a change to that playlist, but later subscribers may not.

Figure 3:
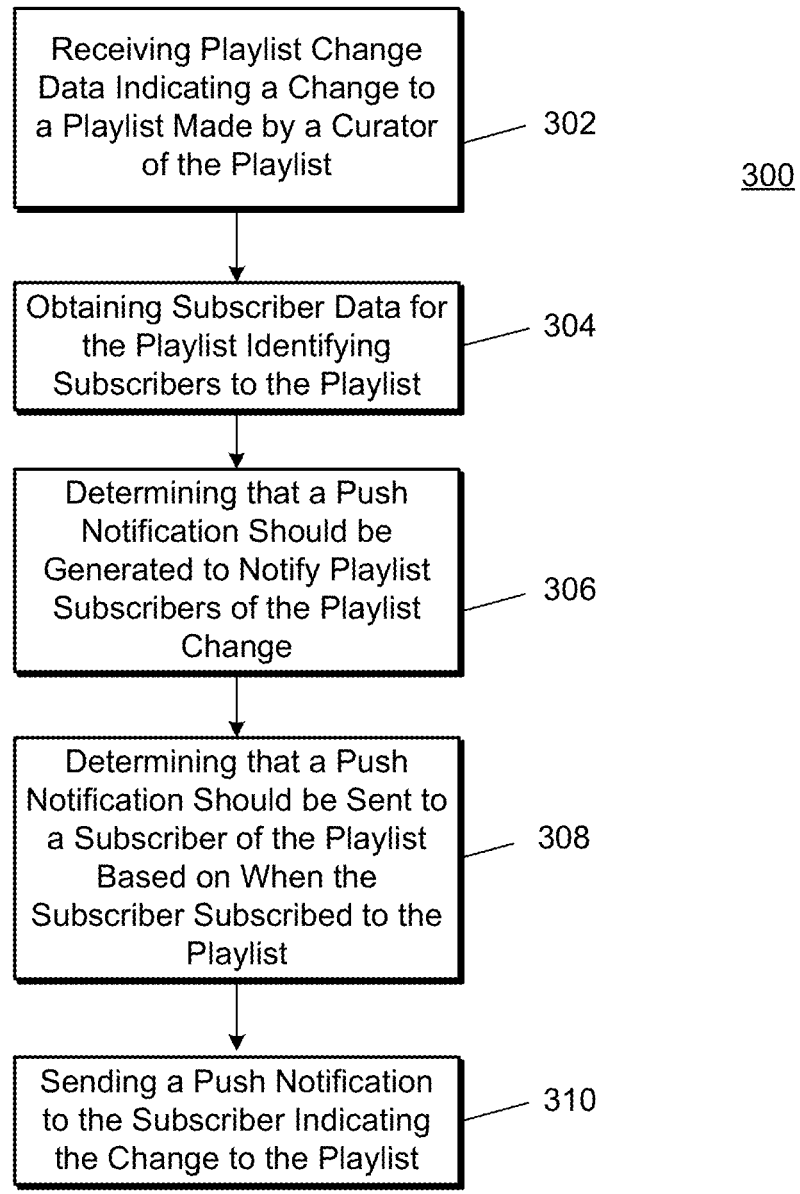
FIG. 3 is a flow diagram of an example process for sending push notification updates to a playlist subscriber based on the current location of the playlist subscriber.

FIG. 3 is a flow diagram of an example process for sending push notifications of updates to a playlist based on the current location of the playlist subscriber. First, the Aggregator Service may receive playlist change data indicating a change to a playlist (302). This change is from a curator user who edits a playlist that they created. A change could be an addition of a song, a change to the order of the songs, it could be a name change, or any other various changes. The Shared Playlist Service records these changes to the playlists and sends the Aggregator Service the playlist change data.

Next, the Aggregator Service may obtain subscriber data for the playlist identifying subscribers to the playlist (304). Again, the Shared Playlist Service includes the data linking the playlist with all of the users who are subscribed to that playlist. This list of subscribers may be accessed by the Aggregator Service and used as criteria in the push/pull scoring and decision.

Next, the Aggregator Service may determine that a push notification should be generated to notify playlist subscribers of the playlist change (306). As described herein, the Aggregator Service may use the data about the playlist as stored by the Shared Playlist Service. The Aggregator Service may determine that only certain playlists require push notifications, which may be based on the capabilities of the service to provide the playlist updates. Once a determination is made that a push notification is to be sent regarding a change to this playlist, the Aggregator Service can determine which subscribers, if not all subscribers, will receive the push notification.

Then, the Aggregator Service may determine that a push notification should be sent to a subscriber of the playlist based on subscriber data regarding when that subscriber first subscribed to the playlist (308). As described herein, the Aggregator Service may use the subscriber data regarding the timing that the individual subscribers first subscribed to the playlist. The time may be an elapsed time since the playlist was first created, or a recorded time that can be compared to the time the playlist was created. The Aggregator Service may calculate a cutoff time for the subscribers, where early subscribers, up to that time, will receive a push notification but later subscribers will not.

Finally, the Aggregator Service may send a push notification to the Subscriber Indicating the Change to the Playlist (310). Once the early subscribers are identified by the Aggregator Service, those subscribers will receive a push notification from the Aggregator Service, prompting their client device to access the system and receive the playlist update.

Subscriber Score—Location Data Example

As previously discussed, one subscriber criteria that may be used by the Aggregator Service in determining a particular subscriber score for a push/pull determination may be location data as sent by the individual subscriber client devices. Examples of location data may be the relative distance between the curator and subscriber. Such location information may be utilized, in relation to a subscriber's proximity to the curator of a playlist. Close subscribers may receive a push notification, or receive a push notification sooner than those subscribers further from the curator.

Figure 4:
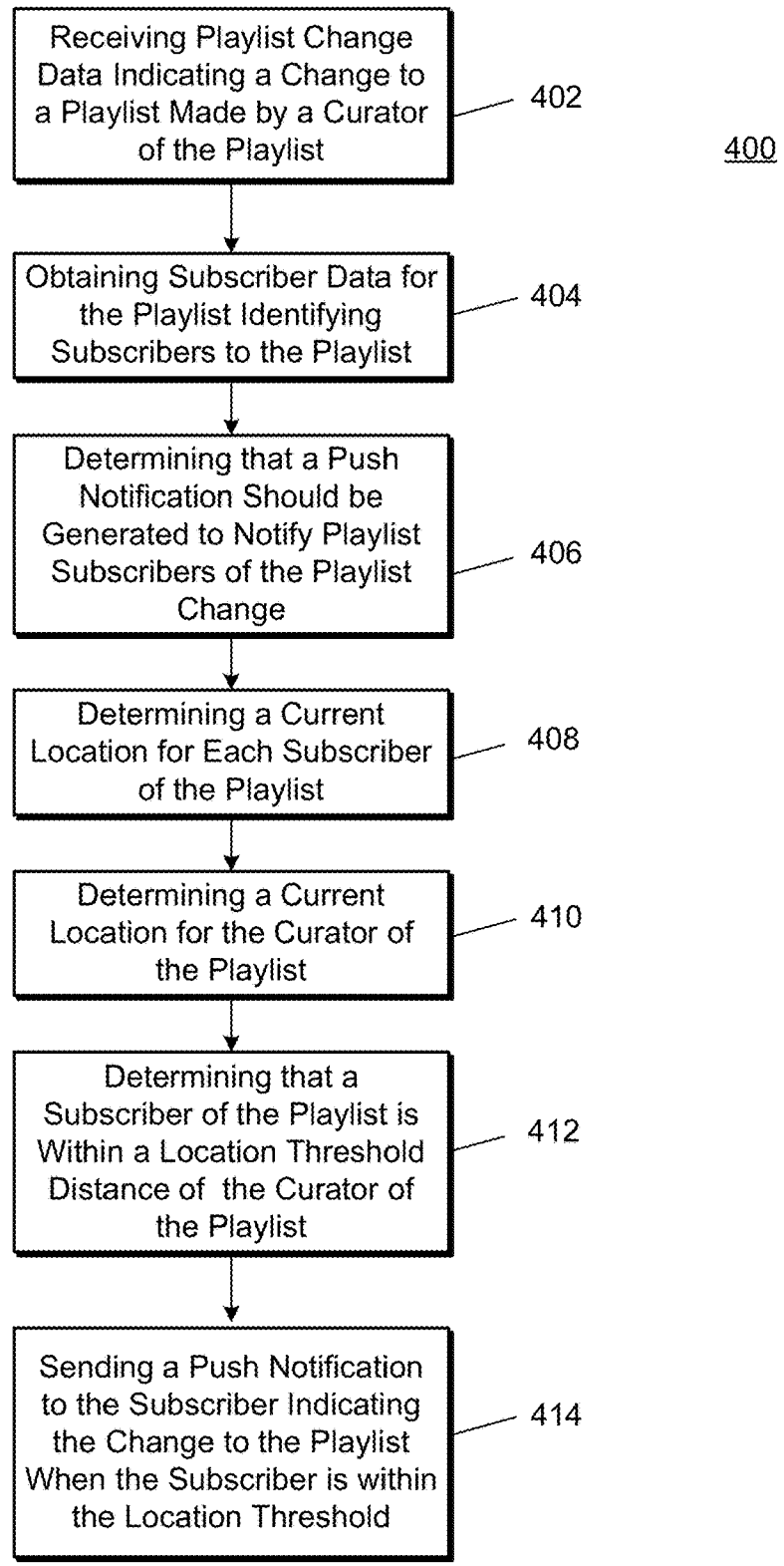
FIG. 4 is a flow diagram of an example process for sending push notification updates to a playlist subscriber based on when the subscriber subscribed to the playlist

FIG. 4 is a flow diagram of an example process for sending push notification updates to a playlist subscriber based on when the subscriber subscribed to the playlist.

In this example, the Aggregator Service may receive playlist change data indicating a change to a playlist made by a curator of the playlist (402). As described above, this change is from a curator user who edits a playlist that they created. A change could be an addition of a song, a change to the order of the songs, it could be a name change, or any other various changes. The Shared Playlist Service records these changes to the playlists and sends the Aggregator Service the playlist change data.

Next, the Aggregator Service may obtain subscriber data for the playlist identifying subscribers to the playlist (404). Again, the Shared Playlist Service includes the data linking the playlist with all of the users who are subscribed to that playlist. This list of subscribers may be sent to the Aggregator Service as criteria in the push/pull scoring and decision.

Then the Aggregator Service may determine that a push notification should be generated to notify playlist subscribers of the playlist change (406). As described herein, the Aggregator Service may use the data about the playlist as stored by the Shared Playlist Service to determine if a particular playlist deserves a push notification to its subscribers. Once a determination is made that a push notification is to be sent regarding a change to a particular playlist, the Aggregator Service can determine which subscribers, if not all subscribers, will receive the push notification.

Next, the Aggregator Service may determine a current location for each subscriber of the playlist (408). The current location for each subscriber in the playlist may come from the individual client devices used by the subscribers. A Global Positioning System, a triangulation system, or other device locator may be used by the individual client devices, and that information may be sent to the Aggregator Service. In certain examples, the Shared Playlist Service may store such location information.

Then the Aggregator Service may determine a current location for the curator of the playlist (410). In a similar fashion, the Aggregator Service may receive information from the client device used by the curator of this playlist.

Next, the Aggregator Service may determine that a subscriber of the playlist is within a threshold distance of the curator of the playlist (412). This threshold distance can be any distance either selected by the curator or determined by the Aggregator Service. Subscribers within this threshold distance, as a relative straight-line distance from the client device of the curator to the client device of the subscriber, will receive a push notification whereas subscribers outside of this threshold will not. This example is further detailed below and in FIG. 5.

For example, if the system is generating subscriber scores based on their location from the curator of the playlist, a high subscriber score may be given to a subscriber close to the curator, and a low subscriber score to a subscriber many miles away from the curator. The threshold may reflect a distance of 100 meters, based on the subscriber score of subscriber location, in order to send a push notification only to high scoring and close proximity subscribers.

Another example of location information may be, additionally or alternatively, geographical location of a subscriber. For example, besides a mere straight-line relative distance between the playlist curator and subscriber, other geographical location information could be used. Examples include but are not limited to every subscriber in a political border such as a national boundary, a region such as Western Europe, a city, a county, a particular school, or a neighborhood. Other examples include user-created or designated boundaries that could be used by the system, for example, every subscriber in a curator's home state, city, or neighborhood regardless of their relative location from the curator.

Finally, if so determined, the Aggregator Service may send a push notification to the subscriber indicating the change to the playlist when the subscriber is near the curator (414). Once the early subscribers are identified by the Aggregator Service, those subscribers will receive a push notification from the Aggregator Service, prompting their client device to access the system and receive the playlist update.

Figure 5:
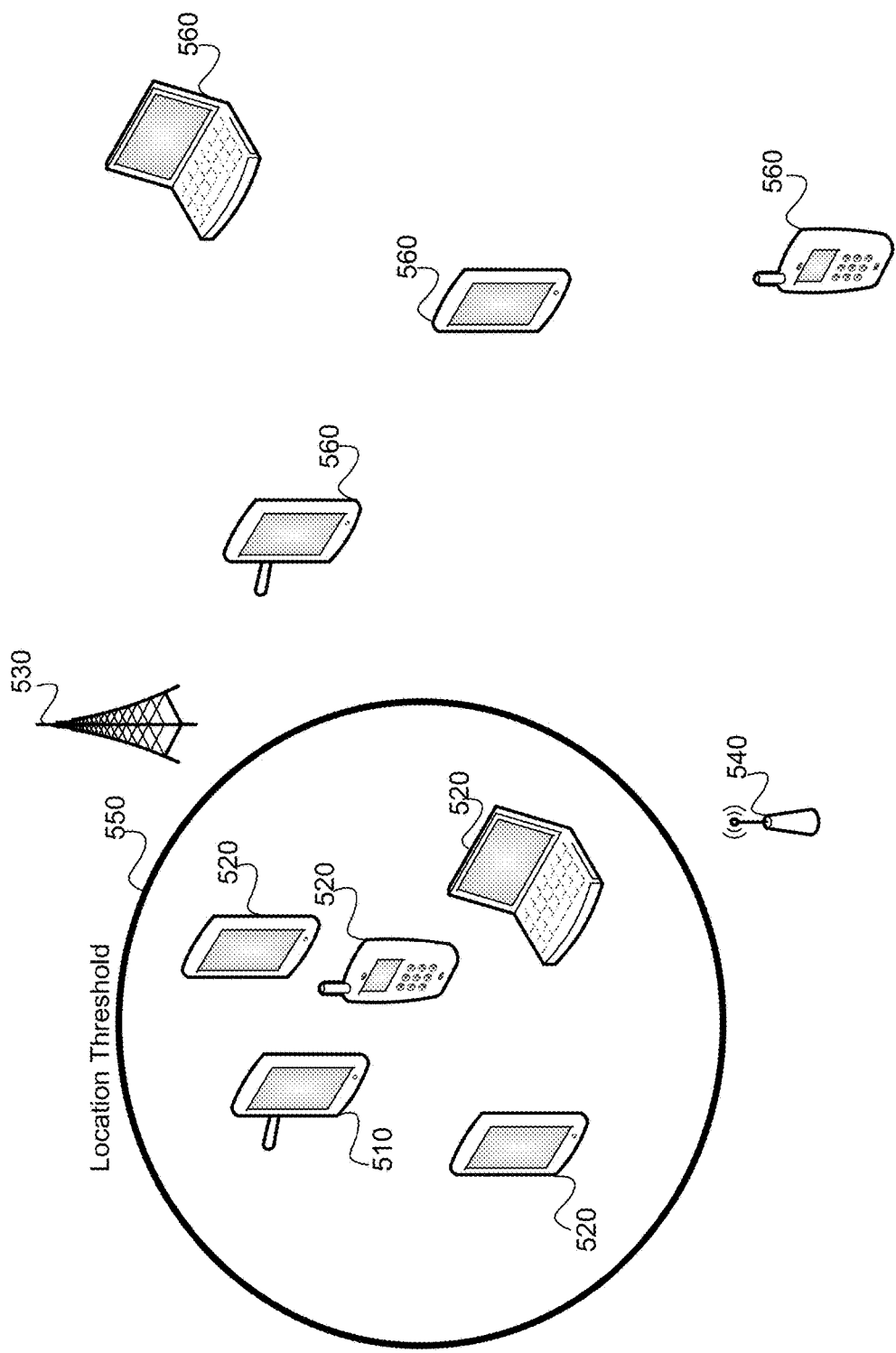
FIG. 5 is an example network diagram showing implementation of the systems and methods using location and distance criteria.

FIG. 5 is an example network diagram showing implementation of the systems and methods using location and straight-line relative distance criteria input to calculate a subscriber score as described herein. In the example of FIG. 5, the playlist curator (510) is in close proximity with four other users (520). In this example, the system is able to discern where these users are, and where they are relative to one another, by information sent by the individual client devices using GPS, or through triangulation of any of various cell towers (530) and/or WiFi antennae (540) or any other geographical location determination systems.

Once the distance between the client devices is determined, the system determines a relative distance threshold (550), relative from the playlist curator to each subscriber. Subscribers (520) within this threshold (550) receive a playlist update push notification. Other users (560), outside of this relative distance threshold (550) should not receive a push notification update prompt and instead the system will allow them to log on separately and pull the updates on their own. An example of a relative distance threshold may be a few hundred feet in a dorm room at college, where friends are gathered. It could be a few hundred yards, for a coffee shop in a shopping complex, or a quarter mile for nearby neighbors. Another example could be a half mile in a concert venue with a large parking lot where a celebrity is back stage before a show, and updating her playlist.

In this way, subscribers (520) who are close to the playlist curator (510) who updates a playlist will be pushed a playlist update notification and will be able to update the playlist on their client devices almost as soon as the curator makes the playlist update. Other subscribers (560) who are further away, and who may not even be expecting an update may not receive this immediate push notification update prompt.

Such location information may also be used by the Aggregator Service to create a subscriber score for each subscriber and use that subscriber score to determine whether the subscriber receives a push notification.

Example System Architecture

Figure 6:
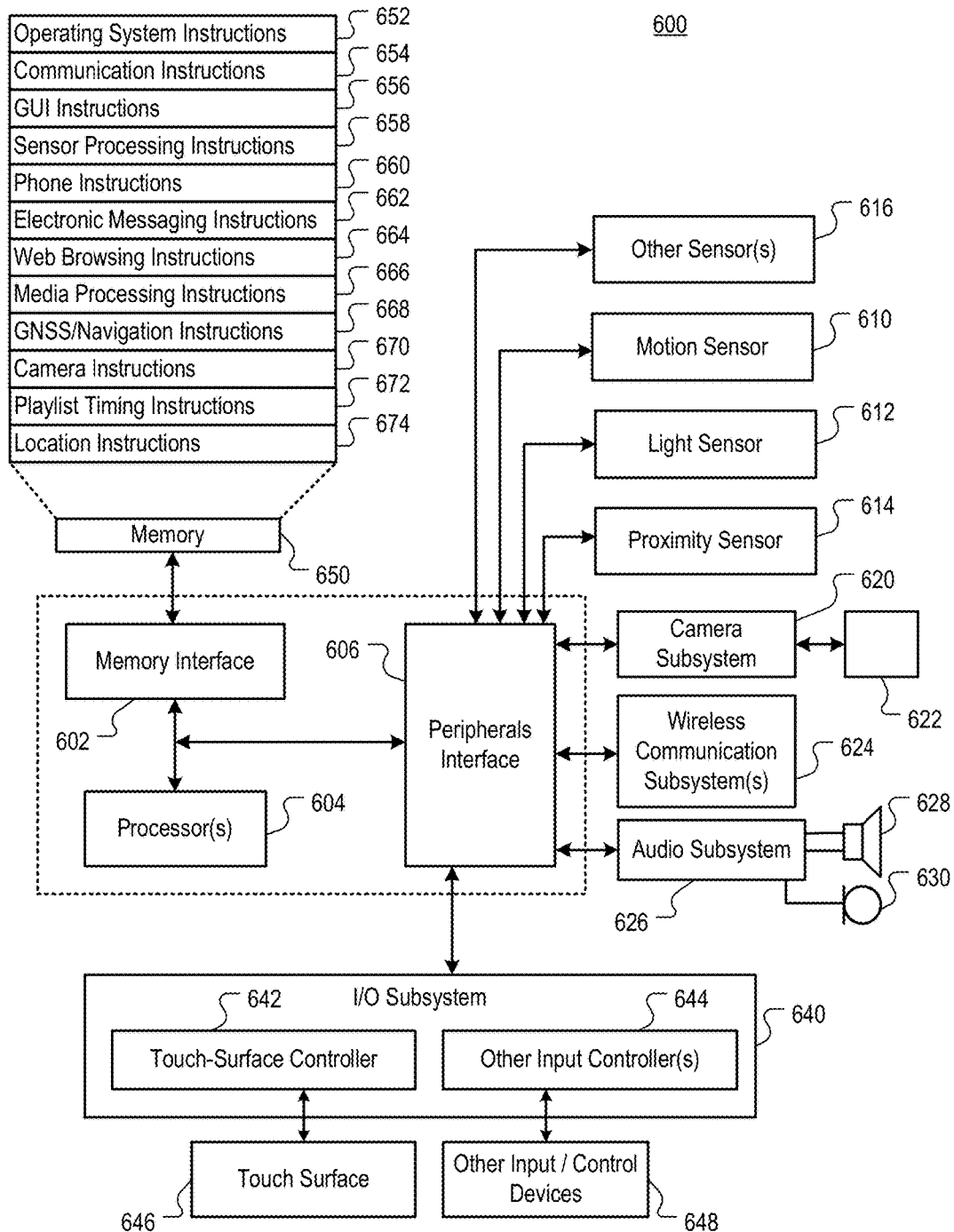
FIG. 6 is a block diagram of an example system architecture implementing the features and processes of FIGS. 1-5.

FIG. 6 is a block diagram of an example system architecture implementing the features and processes of FIGS. 1-5. The computing client device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing client device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing client device 600 is intended to operate. For example, the computing client device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the client device 100 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, voiceprinting and voice authentication, for example.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing client device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing client device 600 can present recorded audio and/or video files, such as MP3, AAC, and MPEG files. In some implementations, the computing client device 600 can include the functionality of an MP3 player, such as an iPod™. The computing client device 600 can, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). For example, operating system 652 can implement the push/pull update decision features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate gathering and sending location information, playlist timing instructions and other client device based information which can be used by the systems and methods described herein.

The memory 650 can also store other software instructions (not shown), such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. A GPS or other location instructions 674 for determining location of the system 600 or similar hardware identifier can also be stored in memory 650.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing client device 600 can be implemented in hardware and/or in software, including in one or more signal processing and/or application specific integrated circuits.

Conclusion

As disclosed herein, features consistent with the present inventions may be implemented by computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as 1PROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks by one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A system comprising:
   one or more processors; and
   a computer-readable medium including one or more sequences of instructions which, when executed by the one or more processors, causes,
      receiving playlist data that describes a collection of media items associated with a playlist;
      receiving playlist subscriber data that associates the playlist with user accounts that have subscribed to the playlist;
      receiving playlist change data that describes a change made to the playlist;
      in response to receiving the playlist change data, generating a push notification score, wherein the push notification score comprises a playlist score, a subscriber score, or any combination thereof, wherein the playlist score is based on a frequency the playlist is changed, the playlist change data, a status of a playlist curator, a number of subscribers to the playlist, or any combination thereof, and the subscriber score is based on a subscriber number representing how many user accounts subscribed to the playlist before a particular subscribed user account subscribed to the playlist, a physical location of a subscriber, a device location of a client device associated with the particular subscribed user account, subscriber interaction with the playlist, a battery life of a subscriber's client device, a notification number of push notifications received within a given time by the client device associated with the particular subscribed user account, or any combination thereof;

sending a playlist update push notification to a client device associated with the particular subscribed user account if the push notification score breaches a push notification threshold value, wherein the playlist update push notification is configured to provide an indication on the client device of the change made to the playlist, and the playlist update push notification is configured to prompt the client device to receive the playlist with the change; and inhibiting the sending of the playlist update push notification to the client device associated with the particular subscribed user account if the push notification score does not breach the push notification threshold value.

2. The system of claim 1, wherein the instructions cause, determining the subscriber number representing how many user accounts subscribed to the playlist before the particular subscribed user account subscribed to the playlist;

comparing the subscriber number to a push threshold number;

sending the playlist update push notification to the client device associated with the particular user account if the subscriber number is less than the push threshold number; and sending the playlist update push notification to the client device associated with the particular user account, based on the push notification score, if the subscriber number is greater than the push threshold number.

3. The system of claim 1 wherein the push notification score comprises the playlist score for the playlist, and wherein the instructions cause:

sending the playlist update push notification to the client device associated with the particular subscribed user account based on the playlist score.

4. The system of claim 3, wherein the playlist score is based on the status of the playlist curator.

5. The system of claim 3, wherein the playlist score is based on the playlist change data.

6. The system of claim 3, wherein the instructions cause: generating the subscriber score for the particular subscribed user account;

sending the playlist update push notification to the client device associated with the particular subscribed user account if the playlist score breaches a playlist push threshold value and the subscriber score breaches a subscriber push threshold value; and inhibiting sending the playlist update push notification to the client device associated with the particular subscribed user account if the playlist score does not breach the playlist push threshold value and the subscriber score does not breach the subscriber push threshold value.

7. The system of claim 6, wherein the instructions cause: determining the subscriber number representing how many user accounts subscribed to the playlist before the particular subscribed user account subscribed to the playlist;

comparing the subscriber number to a push threshold number;

sending the playlist update push notification to the client device associated with the particular user account if the subscriber number is less than the push threshold number; and sending the playlist update push notification to the client device associated with the particular user account, based on the push notification score, if the subscriber number is greater than the push threshold number.

8. The system of claim 6, wherein the subscriber score is based on the physical location of a subscriber or the device location of the client device associated with the particular subscribed user account.

9. The system of claim 1 wherein the push notification score comprises the subscriber score for the particular subscribed user account;

and wherein the instructions cause, sending the playlist update push notification to the client device associated with the particular subscribed user account based on the subscriber score.

10. The system of claim 1 wherein the push notification threshold value changes due to the amount of traffic received by the system.

11. The system of claim 6 wherein the subscriber score is based on the notification number of push notifications received within a given time by the client device associated with the particular subscribed user account.

12. The system of claim 9 wherein the subscriber score is based on the notification number of push notifications received within a given time by the client device associated with the particular subscribed user account.

13. A system comprising:
one or more processors; and
a computer-readable medium including one or more sequences of instructions which, when executed by the one or more processors, causes,
receiving playlist data that describes a collection of media items associated with a playlist, the playlist data identifying a curator for the playlist;
receiving curator location data identifying a current location of a client device associated with a particular user account of a curator of the playlist;
receiving playlist subscriber data that associates the playlist with user accounts that have subscribed to the playlist;
receiving subscriber location data identifying a current location of a client device associated with a particular subscribed user account;
receiving playlist change data that describes a change made to the playlist; and
sending a playlist update push notification to the client device associated with the subscribed user account, based on the curator location data, the playlist change data, and the subscriber location data, wherein the playlist update push notification is configured to provide an indication on the client device of the change made to the playlist, and the playlist update push notification is configured to prompt the client device to receive the playlist with the change.

14. The system of claim 13, wherein the curator location data and the subscriber location data is relative straight-line distance between the curator and subscriber.

15. A method comprising:
by one or more processors,
receiving playlist data that describes a collection of media items associated with a playlist;
receiving playlist subscriber data that associates the playlist with user accounts that have subscribed to the playlist;
generating a playlist score of the playlist based on the received playlist data;
receiving playlist change data that describes a change made to the playlist;
generating a subscriber score based on information regarding a particular subscribed user account; and
sending a playlist update push notification to the client device associated with the subscribed user account, based on the playlist score, the playlist change data, and the subscriber score, wherein the playlist update push notification is configured to provide an indication on the client device of the change made to the playlist, and the playlist update push notification is configured to prompt the client device to receive the playlist with the change.

16. The method of claim 15 wherein the subscriber score is based on the order the subscriber subscribed to the playlist.

17. The method of claim 15 wherein the playlist score includes information regarding the number of subscribers to the playlist.

18. The method of claim 15 wherein the subscriber score includes a number of push notifications the client device associated with the particular subscribed user account has received within a certain time period.

19. The method of claim 15 further comprising,
receiving curator information associated with the curator of the playlist;
generating a curator score based on the received curator information; and
sending a push notification to a client device associated with a subscribed user account based on the playlist score, the playlist change data, the subscriber score and the curator score.

20. The method of claim 19 wherein the subscriber information and the curator information are location information.

21. A system comprising:
one or more processors; and
a computer-readable medium including one or more sequences of instructions which, when executed by the one or more processors, causes,
receiving playlist data that describes a collection of media items associated with a playlist;
receiving playlist subscriber data that associates the playlist with user accounts that have subscribed to the playlist;
receiving playlist change data that describes a change made to the playlist; and
sending a playlist update push notification to a client device associated with a subscribed user account, based on the playlist change data and an order the subscribed user account subscribed to the playlist, wherein the playlist update push notification is configured to provide an indication on the client device of the change made to the playlist, and the playlist update push notification is configured to prompt the client device to receive the playlist with the change.

22. A system comprising:
one or more processors; and
a computer-readable medium including one or more sequences of instructions which, when executed by the one or more processors, causes,
receiving playlist data that describes a collection of media items associated with a playlist
receiving playlist subscriber data that associates the playlist with user accounts that have subscribed to the playlist;
receiving subscriber battery data identifying a current battery life of a client device associated with a particular subscribed user account;
receiving playlist change data that describes a change made to the playlist; and
sending a playlist update push notification to the client device associated with the subscribed user account, based on the subscriber battery data and the playlist change data, wherein the playlist update push notification is configured to provide an indication on the client device of the change made to the playlist, and the playlist update push notification is configured to prompt the client device to receive the playlist with the change.

* * * * *